United States Patent
Kraisler et al.

(10) Patent No.: US 10,216,714 B2
(45) Date of Patent: Feb. 26, 2019

(54) TEXT CHARACTER AND FORMATTING CHANGES IN COLLABORATIVE CONTEXTS

(71) Applicant: APPLE INC., Cupertino, CA (US)

(72) Inventors: Kenneth M. Kraisler, Vancouver, WA (US); Michael S. Lindsey, Vancouver, WA (US); Paul B. Elseth, Vancouver, WA (US)

(73) Assignee: APPLE INC., Cupertino, CA (US)

( * ) Notice: Subject to any disclaimer, the term of this patent is extended or adjusted under 35 U.S.C. 154(b) by 1064 days.

(21) Appl. No.: 14/502,910

(22) Filed: Sep. 30, 2014

(65) Prior Publication Data

US 2016/0092418 A1    Mar. 31, 2016

(51) Int. Cl.
| | | |
|---|---|---|
| *G06F 17/00* | (2006.01) | |
| *G06F 17/30* | (2006.01) | |
| *G06F 17/24* | (2006.01) | |
| *G06F 17/21* | (2006.01) | |
| *G06F 17/22* | (2006.01) | |

(52) U.S. Cl.
CPC ............ *G06F 17/24* (2013.01); *G06F 17/211* (2013.01); *G06F 17/2288* (2013.01)

(58) Field of Classification Search
CPC ... G06F 17/2288; G06F 17/241; G06F 17/211
See application file for complete search history.

(56) References Cited

U.S. PATENT DOCUMENTS

| | | | |
|---|---|---|---|
| 7,499,955 B2 | 3/2009 | Kao et al. | |
| 2011/0078246 A1 | 3/2011 | Dittmer-Roche | |
| 2013/0151940 A1 | 6/2013 | Bailor et al. | |
| 2013/0191720 A1* | 7/2013 | Simons | G06F 17/30882 715/234 |
| 2013/0268844 A1 | 10/2013 | Lemonik et al. | |
| 2014/0149857 A1* | 5/2014 | Vagell | G06F 17/241 715/255 |
| 2015/0193492 A1* | 7/2015 | Gunaratne | G06F 21/6218 707/609 |
| 2015/0277725 A1* | 10/2015 | Masterson | G06F 3/04847 715/753 |
| 2016/0041963 A1* | 2/2016 | Coblenz | G06F 17/245 715/227 |

* cited by examiner

*Primary Examiner* — Cheryl Lewis
(74) *Attorney, Agent, or Firm* — Fletcher Yoder PC

(57) ABSTRACT

The present disclosure relates to implementing text and formatting changes in a collaborative context. In certain embodiments, a single code pathway is employed that may be used for implementing text and format change operations in a collaborative context. In one such implementation, a multi-field or multi-slot storage class structure is provided that allows a forward action provided by a user to be implemented in a collaborative environment and which allows generation of and tracking of undo, rollback, or reapply operations associated with the initial forward action.

26 Claims, 7 Drawing Sheets

|  | | 130 START "REPLACE XY WITH A" | 132 MIDDLE OF "REPLACE XY WITH A" | 134 END OF "REPLACE XY WITH A" | 136 MAKE INVERSE |
|---|---|---|---|---|---|
| 92 → | FA | 0,2 + A | 0,2 + A | 0,2 + A | 0,1 + "XY"<br>1,1 SET BOLD |
| 94 → | IFA | [0] | [0] | [0] | 0,2 + "A" |
| 96 → | DA | [0] | 1,1 CLEAR BOLD<br>0,2 + "A" | [0] | [0] |
| 98 → | IDA | [0] | [0] | 1,1 SET BOLD<br>0,1 + "XY" | [0] |

FIG. 10

|  | | 140 START OF UNDO | 142 MIDDLE OF UNDO | 144 END OF UNDO | 146 MAKE INVERSE |
|---|---|---|---|---|---|
| 92 → | FA | 0,1 + "XY"<br>1,1 SET BOLD | 0,1 + "XY"<br>1,1 SET BOLD | 0,1 + "XY"<br>1,1 SET BOLD | 0,2 + A |
| 94 → | IFA | 0,2 + "A" | 0,2 + "A" | 0,2 + "A" | [0] |
| 96 → | DA | [0] | 0,1 + "XY"<br>1,1 SET BOLD | [0] | [0] |
| 98 → | IDA | [0] | [0] | 0,2 + "A" 1,1 CLEAR BOLD | [0] |

FIG. 11

TEXT CHARACTER AND FORMATTING CHANGES IN COLLABORATIVE CONTEXTS

BACKGROUND

The present disclosure relates generally to facilitating collaborative document development.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of documents (e.g., word processing documents, spreadsheets, slides for slideshows, and so forth, may be generated or edited on various types of processor-based systems, such as computers. In certain instances, there may be a single author or editor entering text or formatting changes in a sequential manner, which can be implemented in a straight forward manner. In practice the changes made by a single user may be implemented by applying a change (i.e., a forward action or a forward case change operation) specified by the user and by applying, as needed, any undo or redo operations specified by the user.

However, in collaborative contexts, where changes may be concurrently generated by two or more authors, it may be difficult to apply and track the specified changes. In particular, changes applied concurrently or nearly concurrently may utilize additional types of operations to implement. For example, in addition to the single user operations (e.g., forward case change operations, undo operations, and so forth), additional operations specific to collaboration may be employed (e.g. rollback operations, reapply operations, and so forth). In particular, such collaboration specific operations are used to address instances where different users specify changes concurrently or nearly concurrently and a mechanism is needed to apply the changes in the proper order with respect to the document on which the users are collaborating.

Implementing such collaborative workflows may be difficult, however. In particular, different code pathways (e.g., four different code pathways) may be employed for each of the various types of operations, leading to substantial development and design complexity. Further, use of multiple code pathways may also increase testing complexity and difficulty, which may manifest as quality issues in the product.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to providing a single code pathway that may be used for implementing different text and format change operations in a collaborative context. This code pathway may be implemented on various types of machines (e.g., computers running the same or different operating systems), on various types of devices (e.g., desktop or laptop computers, tablet computers, cellular telephones, and so forth), or on various types of browsers irrespective of the device on which the browser is running. In one such implementation, a multi-field or multi-slot storage class structure is provided that allows a forward action provided by a user to be implemented in a collaborative environment and which allows generation of and tracking of undo, rollback, or reapply operations associated with the initial forward action. In this manner, an approach is supported in which only a forward action provided by a first user is sent to remote devices used by other user collaborating with the first user. Using only the forward action, the remote users are able to implement not only the indicated forward action, but also any needed undo or rollback actions.

BRIEF DESCRIPTION OF THE DRAWINGS

Various aspects of this disclosure may be better understood upon reading the following detailed description and upon reference to the drawings in which:

FIG. 10 depicts an example of an implementation of a forward text or formatting change using a multi-field storage action group, in accordance with aspects of the present disclosure; and FIG. 11 depicts an example of an implementation of an undo or rollback operation using a multi-field storage action group, in accordance with aspects of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosure is generally directed to facilitating collaborative document production and editing by implementing various operations, such as forward action operations, undo/redo operations, rollback operations, and reapply operations via a single code pathway, as opposed to separate, discrete pathways. In one embodiment, this may be accomplished using a storage action group supporting multiple fields or slots which allow implementation of a forward action, generation of inverse actions, and tracking of such actions within a single code pathway. In this manner efficiency during use can be increased. In addition, product development and testing can be simplified due to the use of a single code pathway for multiple operations, leading to improved development efficiency and improved product quality.

In practice, the single code pathway may be implemented on various types of devices or operating systems. Such implementations may be implemented using a suitable programming language, such as Objective-C®, available from Apple Inc. of Cupertino, Calif. Alternatively, a device agnostic approach may be employed by implementing the single code pathway in conjunction with one or more types of browser suitable for running on different devices or operating systems. Such implementations may be implemented using a suitable programming language, such as JavaScript®.

Figure 1:
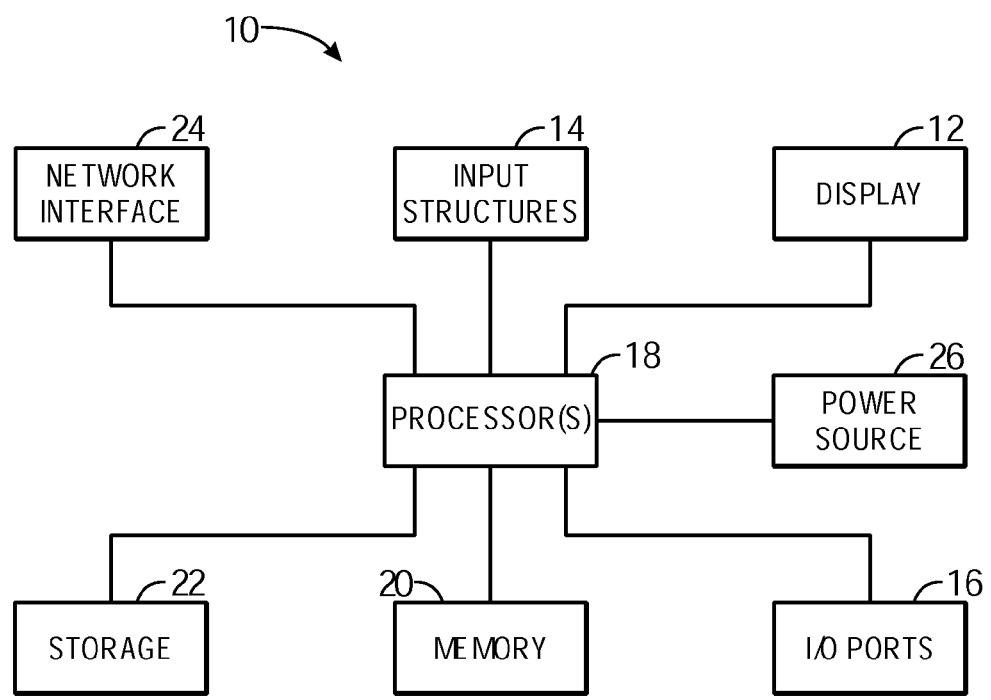
FIG. 1 is a block diagram of an electronic device that may use the techniques disclosed herein, in accordance with aspects of the present disclosure.
Figure 2:
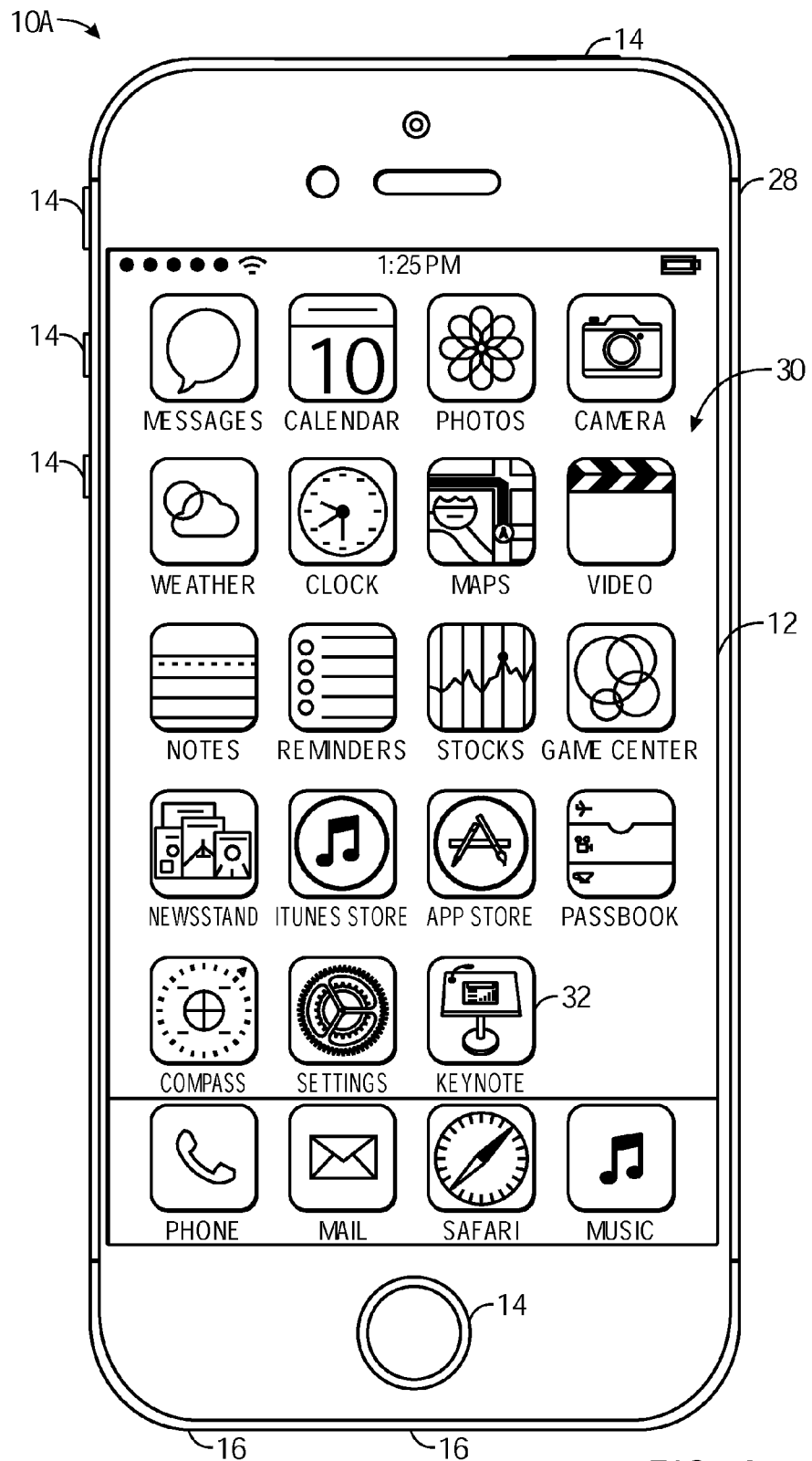
FIG. 2 is a front view of a handheld device, such as an iPhone® by Apple Inc., representing an example of the electronic device of FIG. 1.
Figure 3:
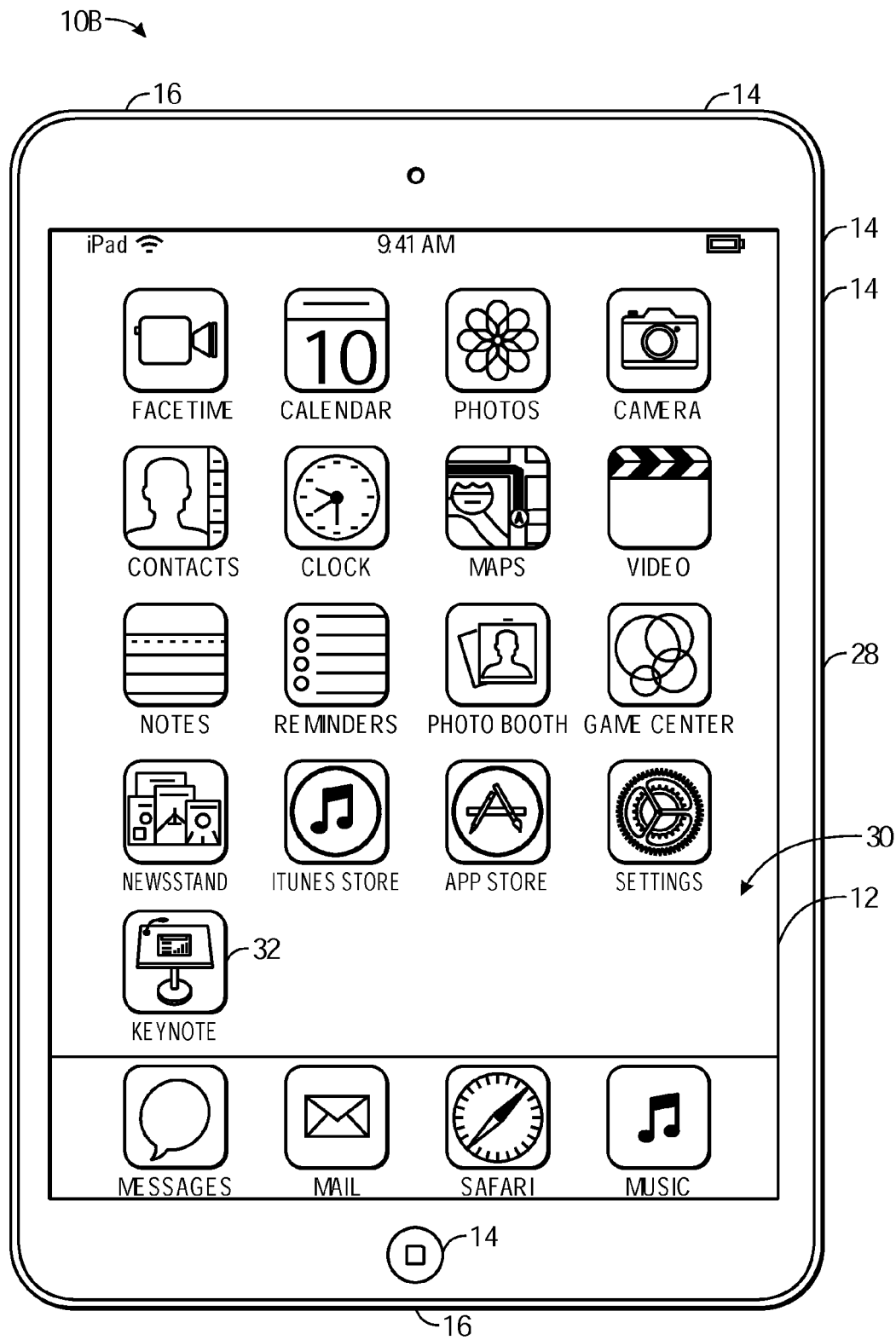
FIG. 3 is a front view of a tablet device, such as an iPad® by Apple Inc., representing an example of the electronic device of FIG. 1.
Figure 4:
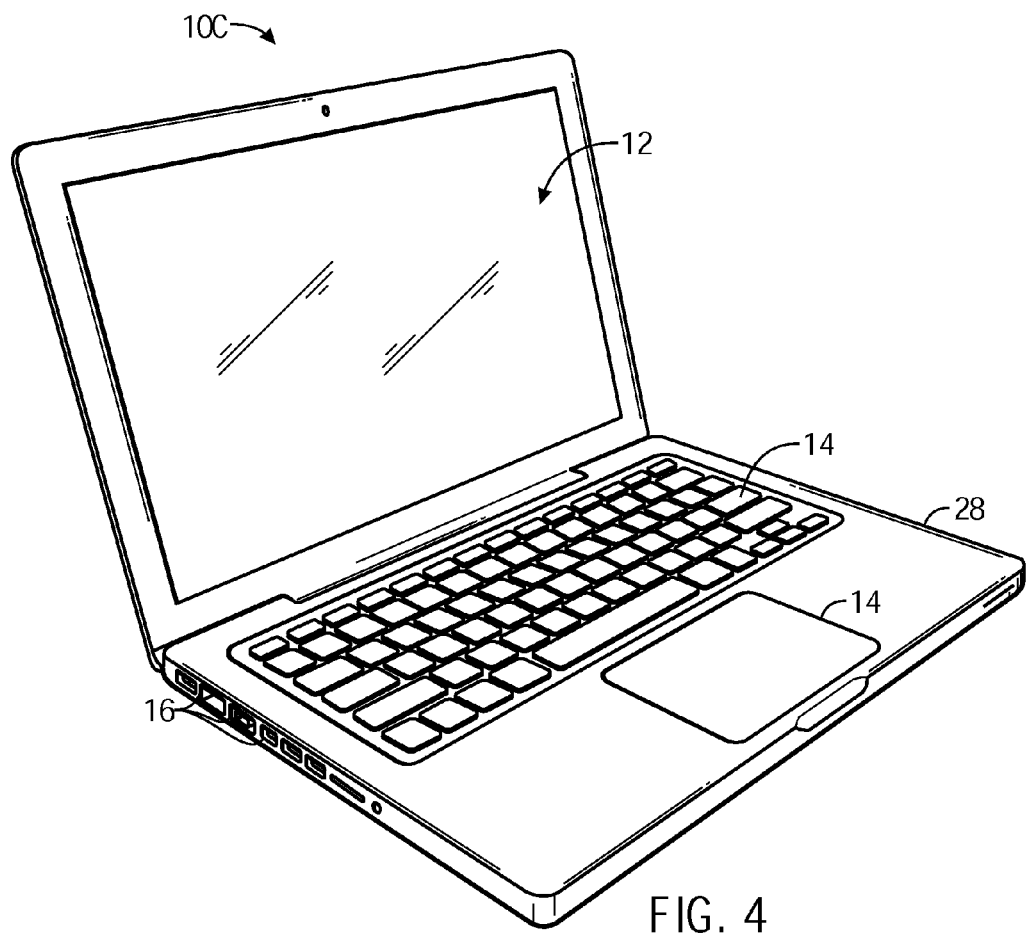
FIG. 4 is a perspective view of a notebook computer, such as a MacBook Pro® by Apple Inc., representing an example of the electronic device of FIG. 1.

A variety of suitable electronic devices, or browsers running on such devices, may employ the techniques described herein to support document generation or modification in a collaborative context. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium, such as for implementing a productivity application or web browser) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.), web browser (e.g., Safari® by Apple Inc.), or an application program (e.g., Numbers®, Pages®, or Keynote® by Apple Inc.) or a suite of such application programs (e.g., iWork® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a web browser (e.g., Safari® by Apple Inc.), spreadsheet application program (e.g., Numbers® by Apple Inc.), a presentation application program (e.g., Keynote® by Apple Inc.), or a word processing application program (e.g., Pages® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the spreadsheet application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Safari®, Numbers®, Pages®, or Keynote® by Apple Inc.) running on the computer 10C.

With the preceding in mind, a variety of computer program products, such as web browsers, applications or operating systems, may use or implement the techniques discussed below to enhance the user experience on the electronic device 10, such as when collaboratively working on a document. Indeed, any suitable computer program product that provides for the creation or modification of a document (e.g., a word processing document, a spreadsheet, a slideshow presentation, a plain text document, and so forth) in a collaborative environment may employ some or all of the techniques discussed below. Though reference to certain types of documents, such as word processing documents, spreadsheets, or slide, are described herein by way of example and to facilitate explanation, it should be appreciated that the present approaches are not limited to these types of documents but are instead more generally applicable to any collaborative context. Thus, while the following examples are provided in the context of a word processing application, the present approaches are suitable for use in other applications (e.g., spreadsheet applications, presentation applications, and so forth) where collaborative document generation and modification may be employed.

With the preceding in mind, an electronic device 10 may store and run a word processing application (e.g., Pages® from Apple Inc.) or other suitable application used to collaboratively generate or modify a document. The application may be stored as one or more executable routines (which may encode and implement the actions described below) in memory and/or storage (FIG. 1). Alternatively, such executable routines may be implemented as part of a web browser implementation which supports collaborative document development or applications running within the browser that support such collaborative document development. These routines, when executed, may cause control codes and logic as discussed herein to be implemented on the electronic device or on a separate electronic device (e.g., a server or other network-connected device) in communication with the electronic device 10. In certain embodiments discussed herein, different users, each using an electronic device 10 that executes routines as discussed herein, may collaboratively create or modify a single document.

For example, each user may make text changes (i.e., adding or removing characters to the character stream model) as well as formatting changes (i.e., marking text as bold, underlines, or italicized, applying a font or size change, applying a hyperlink, applying RUBY text, applying a bookmark over a range of text, and so forth) in a document on which they are collaborating. In such a collaborative context, each device 10 is configured to implement operations such as: (1) a forward change operation or forward action (in which a text or formatting change input by a user is applied); (2) an undo/redo operation (in which a forward action may be undone or, once undone, applied again); (3) a rollback operation (a collaborative operation in which a change made by a local user is reversed to allow changes made by a remote user to be applied so that changes are applied in the proper time order); and (4) a reapply operation (a collaborative operation in which a change that has been rolled back due to collaborative asynchrony is applied again after one or more remote changes have been applied). Rollback and reapply operations may occur frequently during collaborative sessions and are part of a fundamental process by which remote changes are applied to a local system being worked on by a given user. That is, the rollback and reapply operations allow each user to use separate local systems to jointly (i.e., collaboratively) work on a given document so that changes made by each user are properly reflected in the collaborative document.

Figure 5:
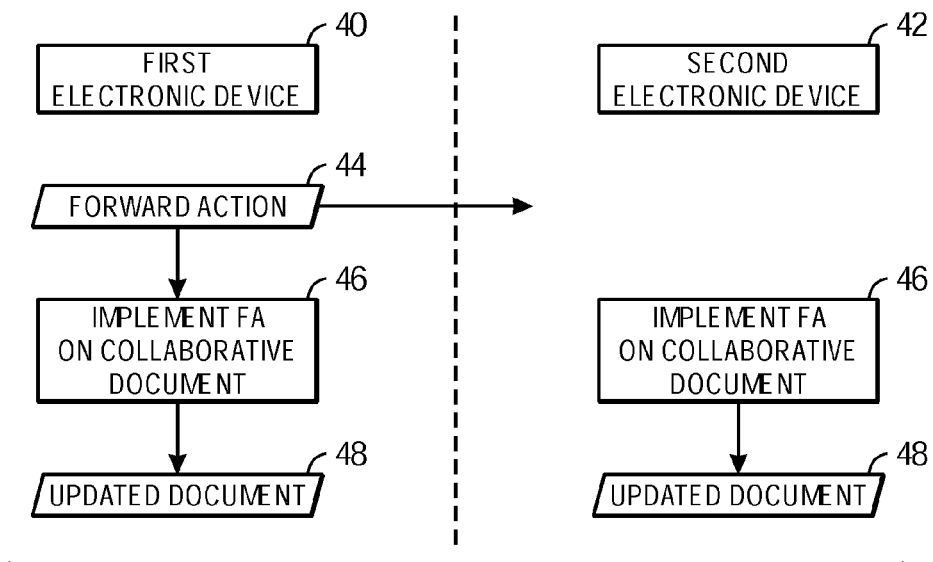
FIG. 5 depicts an example of a collaborative operation implementing a forward action on two separate electronic devices, in accordance with aspects of the present disclosure.
Figure 6:
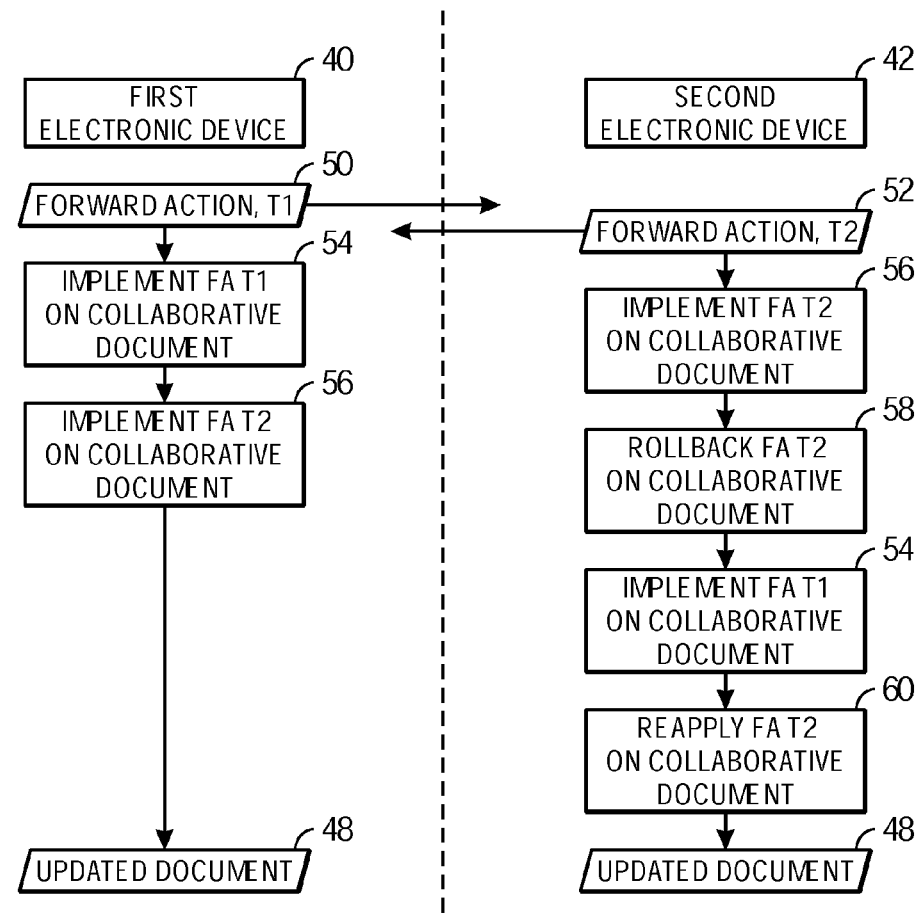
FIG. 6 depicts an example of a collaborative operation implementing a pair of substantially coincident forward actions on two separate electronic devices, in accordance with aspects of the present disclosure.

To illustrate these concepts, and turning to FIGS. 5 and 6, two examples of a collaborative document session are provided. As noted above, applications used to generate the collaborative document represented in these examples, may run native on the devices in question or as part of a web browser implementation capable of running on a variety of devices and operating systems. In the example of FIG. 5, a first electronic device 40 and a second electronic device 42 are used by different users to concurrently generate or edit a collaborative document. In this example the user of the first electronic device 40 makes a change to the text or formatting of the document, such as inserting additional text or changing existing text. The changes made by the user of the first electronic device are conveyed by a forward action 44, (such as add "dog" at a particular location in the collaborative document). The forward action 44 is implemented (block 46) locally on the first electronic device 40, as discussed in greater detail below. In addition, the forward action 44 is sent to the remote second electronic device 42, where the forward action 44 is also implemented (block 46). In certain implementations discussed herein, only the forward action 44 is sent to the remote electronic device (here device 42), meaning that corresponding undo/redo, rollback, and reapply instructions are not sent with the forward action 44. Once the forward action 44 is implemented on both the first electronic device 40 and the second electronic device 42, each device will concurrently display an updated document 48 reflecting the changes made by the forward action 44.

As will be appreciated, the example described with respect to FIG. 5 is particularly straight-forward in that no changes are made at the second electronic device 42 within the time frame that the forward action 44 is being sent and implemented. Turning to FIG. 6, a more complex example is provided in which changes made at the different remote devices 40, 42 occur close in time. In this example, as in the preceding example, a user of the first electronic device 40 may make a change on the collaborative document (i.e., a text or formatting change) that is implemented locally on first electronic device 40 and sent to the second electronic device 42 that is remote from the first device 40. In this example, this change made at the first electronic device 40 is conveyed by the forward action 44 occurring at a first time ($T_1$), which is implemented (block 54) at the first electronic device 40 and sent to the second electronic device 42 at $T_1$. In certain embodiments, only the first forward action 50 is sent to the second electronic device 42, without corresponding, undo/redo, rollback, or reapply instructions.

Concurrent with this activity, the user of the second electronic device 42 makes a different set of text or formatting changes (forward action 52) to the collaborative document at a second time, $T_2$, which occurs after the first time. In this example, the forward action 52 generated at $T_2$ is implemented (block 56) locally on the second electronic device 42 and sent to the first electronic device 40 that is remote from the second device 42. In certain embodiments, only the second forward action 52 is sent to the first electronic device 40, without corresponding, undo/redo, rollback, or reapply instructions. Because T2 is after T1, the second forward action 52 is sent after the first forward action 50. However, in this example, because the second forward action 52 is local to the second electronic device 42 it is implemented locally on the collaborative document prior to receipt of or processing of the first forward action 50 at the second electronic device 42.

Therefore, to process the remotely generated first forward action 50 in the proper time sequence, the second electronic device 42 performs a rollback (block 58) of the second forward action 52 prior to implementing (block 54) the remotely generated first forward action 50. Once the first forward action 50 is performed, the second electronic device 42 reapplies (block 60) the second forward action 52 so that the first forward action 50 and the second forward action 52 are applied in the temporal sequence in which they were generated.

Contrary to this process flow, at the first electronic device 40, because the remotely generated second forward action 52 is received or queued after the locally generated first forward action 50, the second forward action is implemented (block 56) after the first forward action 50. That is, on the first electronic device 40, the order in which the first forward action 50 and the second forward action 52 are applied corresponds to the order in which the forward actions are generated. As a result, no rollback or reapply operations are needed at the first electronic device 40. As a consequence of these differing process flows, both the first electronic device 40 and the second electronic device 42 display the same updated document 48 once processing of the first forward action 50 and second forward action 52 is completed.

With the preceding in mind, aspects of the implementation of the above described forward action operations, undo/redo operations, rollback operations, and reapply operations are described in greater detail below. In one implementation discussed herein, the transaction system does not consider particular details of a given text or formatting change other than that the desired action is a text or formatting change. In this sense, the approach is data driven rather than algorithm driven.

With this in mind, in one embodiment discussed herein, a system of data classes is employed that enables all four change operations to be implemented using a single code pathway, as opposed to four separate pathways. That is, in such an embodiment the client code does not supply separate undo, rollback, and reapply code (i.e., different code paths for each type of operation) but instead only specifies the forward case. By way of example, in one such implementation the client code may only specify a text and formatting change to be implemented as the forward case (e.g., change the two characters "ab" to "xy" and apply a bold format to the two changed characters). Because the client code employs the presently disclosed storage transaction protocol, the undo/redo, rollback, and reapply operations are automatically supported. As a result a person writing a new feature need only provide the forward case and utilize the presently disclosed transaction system, to obtain the undo/redo, rollback, and reapply operations automatically as a consequence of the single code pathway.

Figure 7:
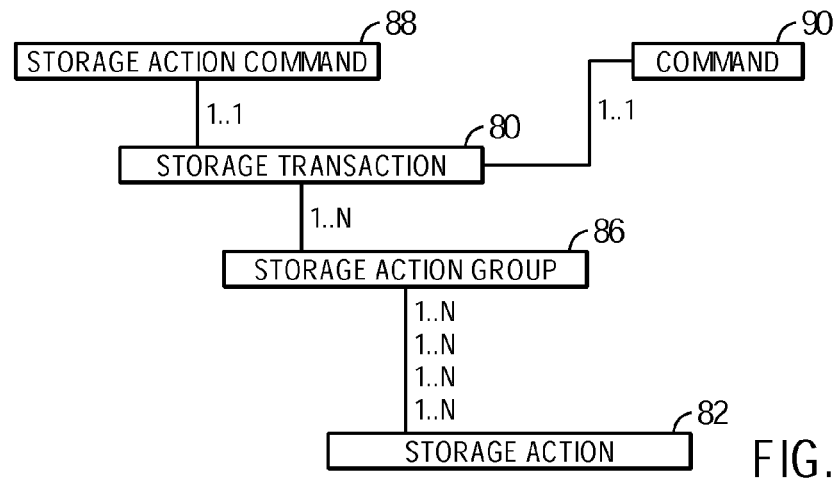
FIG. 7 depicts an example of a class structure suitable for implementing a multi-field storage action group, in accordance with aspects of the present disclosure.
Figure 8:
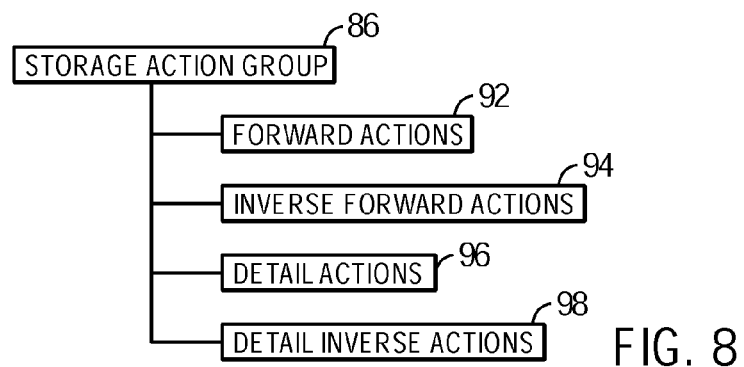
FIG. 8 depicts an example of a multi-field storage action group, in accordance with aspects of the present disclosure.

An example of one such implementation is illustrated in FIGS. 7 and 8. Turning to FIG. 7, a sample class structure is illustrated suitable for capturing a variety of text (i.e., characters) as well as the type of change or changes to be applied, i.e., textual or formatting. In this example of a class structure, a Storage Transaction 80 captures data using Storage Actions 82. In one implementation, one or more Storage Actions 82 are rolled into a Storage Action Group 86. Thus, a given Storage Action Group 86 may contain multiple Storage Actions 82, each corresponding to a text or formatting change to be applied. Thus, from the Storage Transaction 80, respective Storage Action Commands 88 or other commands 90 may be implemented.

In one embodiment, the Storage Action Group 86 defines four "slots" (e.g., fields), which facilitate support of the four phases (i.e., types of operations) that may be employed in a collaborative context. For example, turning to FIG. 8, a Storage Action Group 86 may include a slot or field corresponding to a forward action 92, an inverse forward action 94, a detail action 96, and a detail inverse action 98 for each Storage Action 82. As used herein, the forward action 92 may be understood as corresponding to the user intent, i.e., the change the user intends to make on the character stream model; the detail actions 96 may be understood to be those actions or steps needed to accomplish the forward action 92; the detail inverse action 98 may be understood as corresponding to the actions or steps needed to reverse and undo a respective detail action 96; and the inverse forward action 94 may be understood as corresponding to the opposite of the user intent, which will typically be free of any "fattening" of the instruction set that may otherwise occur that may hinder achieving the intent of the user in a undo or rollback context.

With the preceding in mind, in an example where a user is performing a forward case operation, such as by making a series of textual or formatting changes to a document, one or more forward actions 92 may be generated that correspond to the immediate changes to be made to accomplish the user's intent. These forward actions 92 may then added to the storage action group 86. In one implementation, the forward actions 92 are converted into corresponding detail actions 96. The detail actions 96 may be executed to accomplish the intended change to the current model (e.g., the character stream model). Upon change of the current model, the detail inverse action 98 is populated (based on the corresponding detail action 96). Thus, in one such embodiment, there is one detail inverse action 98 for each detail action 96. The field containing the detail action 96 may then be cleared out as being unnecessary.

During a collaborative session in which two separate users are concurrently revising a shared document, the present approach may be implemented such that only the forward action 92 is sent to the remote machine (i.e., the electronic device(s) 10 on which the other collaborator(s) is working). Based on the forward action 92 received from a collaborator's electronic device 10 and on any forward actions 92 generated at the local electronic device 10, the local electronic device may execute the respective forward actions 92 generated by both collaborators so as to maintain the local representation of the collaborative document in the same state as other representations of the collaborative document.

Figure 9:
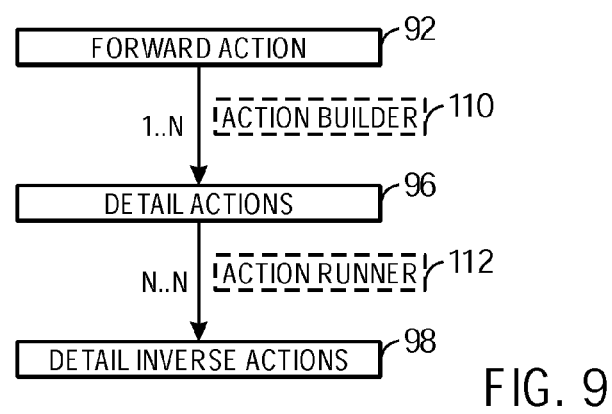
FIG. 9 depicts a process flow for generating detail actions and detail inverse actions from an initial forward action, in accordance with aspects of the present disclosure.

Conceptually, certain of these concepts are illustrated in FIG. 9, in which an initial forward action 92 is provided. A build routine (e.g., action builder 110) maybe executed which generates one or more detail actions 96 based on the forward action. When the detailed action(s) is executed by an execution routine (e.g., action runner 112), the detail inverse action(s) 98 may be correspondingly generated and stored. As will be appreciated, in a collaborative context, when a rollback operation is performed the detail inverse action 98 may be used to "rewind" the character stream model to an earlier state. Similarly, in such a collaborative context, when a reapply operation is performed the forward action 92 may be used to once again generate the corresponding detail action 96 and inverse action 94.

Based on the detail inverse action 98, a "make inverse" call at the Storage Transaction level 80 may be implemented to generate an object for an undo operation. For example, in one implementation a "make inverse" call causes an action stored in the forward action 92 field to be moved to the inverse forward action 94 field. Correspondingly, the action stored in the detail inverse action 98 field is moved to the forward action 92 field. That is, in response to a command to "make inverse", the forward action is moved to become the inverse forward action while the inverse action (here the detail inverse action) becomes the forward action. In one embodiment, after completion of these steps both the detail action 96 and detail inverse action 98 fields may be cleared.

With the preceding in mind, and turning to FIGS. 10 and 11, an example is depicted of the implementation of a text and formatting change in accordance with the present disclosure. In particular, FIGS. 10 and 11 illustrate the changes that may occur within the fields of a storage action group 86 during operation. Turning to FIG. 10, a forward action operation with a make inverse step is shown with respect to the contents of a given storage action group 86. Initially, a user generates a forward action by indicating one or more changes to be made to a collaborative document. In the depicted example, the forward action indicated by the user is to replace the letters "XY" with the letter "A", where the letter "Y" is formatted bold. This change is reflected in the first column 130 by showing the inverse forward action field 94, the detail action field 96, and the inverse detail action field 98 as unpopulated ("null") and the forward action field 92 as populated with the instruction "0,2+'A'". This instruction indicates that the program is to go to position "0", select "2" characters (here the "XY"), and replace ("+") the two selected characters with the indicated character(s) ("A"). The forward action, thus, characterizes the input provided by the user.

To implement the forward action, and turning to column 132, the detail action field 96 is populated with the explicit instructions to be carried out in order to achieve the user's expressed intent as indicated by the forward action 92. As will be appreciated, this corresponds to the actions performed by the action builder 110 described with respect to FIG. 9. In this example, the detail action field 96 is populated by two steps. The first step, "1,1, clear bold" indicates that the program is to go to position "1" (i.e., the "Y" position), to select one ("1") character, and to clear the bold format applied to that character. The second step to be performed is "0,2+'A'", as discussed above with respect to the forward action, which when executed will replace the "XY" characters with an "A" character, where the position "1" (i.e., the letter "Y") will be unbolded prior to the replacement operation. Thus, at the beginning of the operation, only the forward action field 92 is populated and as the operation precedes, the detail action field 96 is also populated, such as in response to invocation of the action builder 110. At this point in the operation, no change has been made to the collaborative document.

Upon invocation of the action runner 112 (FIG. 9), the instructions within the detail action field 96 are performed in sequence. As part of the execution operation, the detail action field 96 is cleared and the inverse detail action field 98 is populated (column 134) with the opposite (i.e., inverse) instruction set of what was previously stored in the detail action field 96. In this example, the inverse detail action field 98 is populated with the instructions "1,1 set bold" (indicating go to position "1", select one ("1") character, and set formatting to bold) and "0,1+'XY'" (indicating go to position "0", select one ("1") character and replace ("+") the character with "XY").

As shown in column 136, to make the inverse command, the instructions within the inverse detail action field 98 are reordered in reverse sequence and used to populate the forward action field 92 (i.e., choosing to perform an undo or rollback operation means that the reverse and opposite of the previously executed detail action is now the current forward action). Correspondingly, the previous content of the forward action field 92 may be used to populate the inverse forward action field 94, which then corresponds to an "unfattened" instruction set corresponding to the user's initial intent which has been implemented.

Turning to FIG. 11, an undo operation (in a local context) or rollback operation (in a collaborative context) based on the example of FIG. 10 is described, including a make inverse step (which would correspond to a reapply operation). At column 140, the status of the fields of the storage action group 86 is shown at the start of the undo or rollback operation. In this example, at the start of the undo or rollback operation, the column 140 is populated as shown in column 136 of FIG. 10. That is, the result of the make inverse call concluding the application of the previous forward action is the starting point for the undo or rollback operation of FIG. 11, as shown at column 140. Thus, at the beginning of the undo or rollback operation of FIG. 11, the forward action field 92 is populated with the instructions "0,1+'XY'" and "1,1 set bold", as discussed with respect to column 136 of FIG. 10. The inverse forward action field 94 of column 140 is populated with the instruction "0,2+'A'", also as discussed with respect to column 136 of FIG. 10.

Based on this forward action 92, and turning to column 142, the detail action field 96 is populated based on the instructions to be carried out in order to implement the invoked undo or rollback operation. As noted above, this corresponds to the actions performed by the action builder 110 described with respect to FIG. 9. In this example, the detail action field 96 is populated by two steps. The first step, "0,1, +'XY'" indicates that the program is to go to position "0" and select one ("1") character and to replace the selected character with the characters "XY". The second step to be performed is "1,1 set bold" which indicates that the program is to go to position "1" (i.e., the "Y" position) and to set the formatting at that position to bold. At this point in the operation, no change has been made to the collaborative document.

Upon invocation of the action runner 112 (FIG. 9), the instructions within the detail action field 96 are performed in sequence. As part of the execution of this operation, the detail action field 96 is cleared and the inverse detail action field 98 is populated (column 144) with the opposite (i.e., inverse) instruction set of what was previously stored in the detail action field 96. In this example, the inverse detail action field 98 is populated with the instructions "0,2+'A'" (indicating go to position "0", select two ("2") characters and replace ("+") the two characters with "A") and "1,1 clear bold" (indicating go to position "1", select one ("1") character, and clear bold formatting).

As shown in column 146, in response to a call to make the inverse command, the instructions stored in the inverse forward action field 94 is moved to the forward action field 92 and the remaining fields are cleared. As will be appreciated, the forward action field 92 which corresponds to the inverse of the applied undo or rollback operation corresponds to the initial forward action received from the user, as indicated at column 130 of FIG. 10. In the event that a redo or reapply operation is invoked, the forward action field 92 generated in response to the make inverse call performed at the end of the undo or rollback operation will be performed as discussed herein.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor-implemented method for processing collaborative data inputs, comprising:
    on a local electronic device, receiving an initial input to trigger generation of a forward action, a detail action, and an inverse action generated by a remote electronic device, wherein the detail action comprises one or more steps for implementing the forward action on the local electronic device and the inverse detail action comprises an opposite action of the detail action;
    updating a first field of a data structure with the forward action;
    updating a second field of the data structure with the detail action;
    changing a local version of a collaborative document by executing the detail action;
    updating a third field of the data structure with the inverse detail action;
    updating the first field of the data structure based on the inverse detail action; and
    updating a fourth field of the data structure with the forward action.

2. The processor-implemented method of claim 1, wherein the initial input received by the local electronic device includes only the forward action.

3. The processor-implemented method of claim 1, comprising clearing the second field of the data structure when the third field of the data structure is updated with the inverse detail action.

4. The processor-implemented method of claim 1, wherein updating the first field of the data structure based on the inverse detail action comprises reversing the order of steps of the inverse detail action.

5. The processor-implemented method of claim 1, comprising clearing the third field of the data structure when the first field of the data structure is updated based on the inverse detail action.

6. The processor-implemented method of claim 1, wherein the forward action comprises one or both of a text change or a formatting change to the collaborative document.

7. The processor-implemented method of claim 1, wherein changing the collaborative document comprises revising a character string model.

8. The processor-implemented method of claim 1, wherein the first field comprises a forward action field, the second field comprises a detail action field; the third field comprises an inverse detail action field, and the fourth field comprises an inverse forward action field.

9. A processor-implemented method for processing collaborative data inputs, comprising:
    on a local electronic device, receiving an initial input to trigger generation of an undo or rollback operation, wherein the undo or rollback operation comprises one or more steps for reversing a change to reapply the change in a time order;
    in response to the initial input, updating a first field of a data structure with a forward action derived from a previous inverse detail action of a preceding operation and a fourth field of the data structure with an inverse forward action comprising the previous forward action of the preceding operation;
    updating a second field of the data structure with the detail action;
    changing a local version of a collaborative document by executing the detail action;
    updating a third field of the data structure with the inverse detail action;
    updating the first field of the data structure based on the inverse forward action.

10. The processor-implemented method of claim 9, wherein the forward action is derived from the previous inverse detail action by reversing the order of steps of the previous inverse detail action.

11. The processor-implemented method of claim 9, wherein the initial input received by the local electronic device includes only the previous forward action.

12. The processor-implemented method of claim 9, comprising clearing the second field of the data structure when the third field of the data structure is updated with the inverse detail action.

13. The processor-implemented method of claim 9, comprising clearing the second field, third field, and fourth field of the data structure when the first field of the data structure is updated with the inverse forward action.

14. A processor-based system, comprising:
    a display;
    a memory storing one or more routines; and
    a processing component configured to execute the one or more routines stored in the memory, wherein the one or more routines, when executed by the processing component, cause the processing component to:

run an application used to generate or modify a local version of a collaborative document;

receive collaborative updates from one or more remote electronic devices on which the application is concurrently run to generate or modify the local version of the collaborative document, wherein each collaborative updates include only a forward action;

process each forward action via a single code pathway so as to trigger generation of and track a corresponding detail action and inverse actions within a single data structure; and update the local version of the collaborative document using detail action or inverse actions within the single data structure.

15. The processor-based system of claim 14, wherein the collaborative updates do not include detail actions or inverse actions corresponding to the forward actions.

16. The processor-based system of claim 14, wherein the single data structure comprises a storage action group comprising four fields.

17. The processor-based system of claim 16, wherein the storage action group comprises a forward action field, an inverse forward action field, a detail action field, and an inverse detail action field.

18. A non-transitory, tangible computer-readable medium encoding processor-executable routines, wherein the routines, when executed by a processor cause acts to be performed comprising:

receiving one or more local inputs comprising forward actions to be applied to a collaborative document being displayed on a local electronic device;

receiving at least one remote input from a remote electronic device also comprising a forward action to be applied to the collaborative document;

processing the forward actions generated both locally and remotely by a single code pathway such that each forward action, when processed by the single code pathway, is used to trigger generation of and track one or more corresponding detail actions, inverse detail actions, and inverse forward actions; and changing a local version of the collaborative document by executing the detail actions.

19. The non-transitory, tangible computer-readable medium, of claim 18, wherein the forward actions convey text and formatting changes.

20. The non-transitory, tangible computer-readable medium of claim 18, wherein applying the detail actions is performed to execute the forward action, to execute an undo or redo operation, to execute a rollback operation, or to execute a reapply operation.

21. The non-transitory, tangible computer-readable medium of claim 18, wherein processing the forward actions by the single code pathway comprises populating a multi-field storage action group with the detail actions, the inverse detail actions, and the inverse forward actions derived for each forward action.

22. A data structure implemented by a processor, comprising:

a forward action field configured to be populated by a forward action input received from a local or remote user, wherein the forward action input triggers generation of a detail action field, an inverse action field, and an inverse forward action field;

a detail action field configured to be updated by one or more detail action steps that implement the forward action input;

an inverse detail action field configured to be updated by the opposite of the detail action steps; and an inverse forward action configured to be updated by the opposite of the forward action input.

23. The data structure of claim 22, wherein the inverse detail action field is populated and the detail action field is cleared when the detail actions steps are executed.

24. The data structure of claim 22, wherein the detail action field and the inverse detail action field are unpopulated when the forward action field is initially populated.

25. The data structure of claim 22, wherein the detail action field and the inverse detail action field are cleared upon completion of a make inverse call performed at a conclusion of a forward action operation, and undo or redo operation, a rollback operation, or a reapply operation.

26. A processor-implemented method for processing collaborative data inputs, comprising:

on a local electronic device, receiving an initial input to trigger generation of a forward action, a detail action, and an inverse action generated by a remote electronic device, wherein the detail action comprises one or more steps for implementing the forward action on the local electronic device and the inverse detail action comprises an opposite action of the detail action;

updating a first field of a data structure with the forward action;

updating a second field of the data structure with the detail action;

changing a local version of a collaborative document by executing the detail action; and updating a third field of the data structure with the inverse detail action.

* * * * *